Feb. 21, 1956 W. J. LORENZ 2,735,129
SPONGE RUBBER BROOM
Filed Jan. 23, 1953
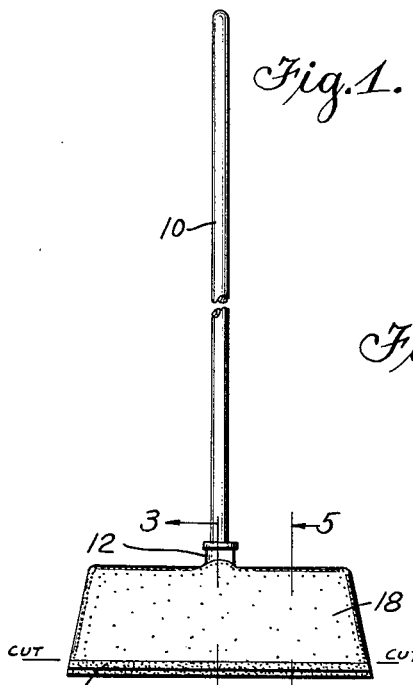
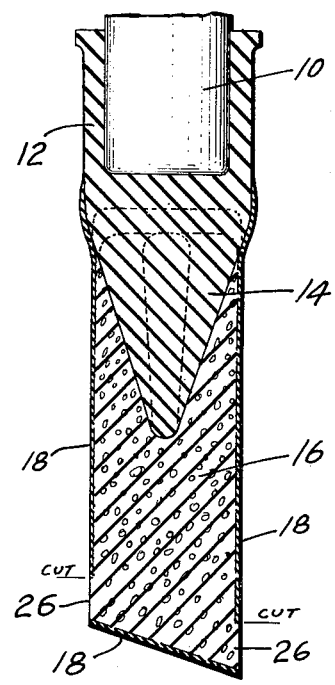
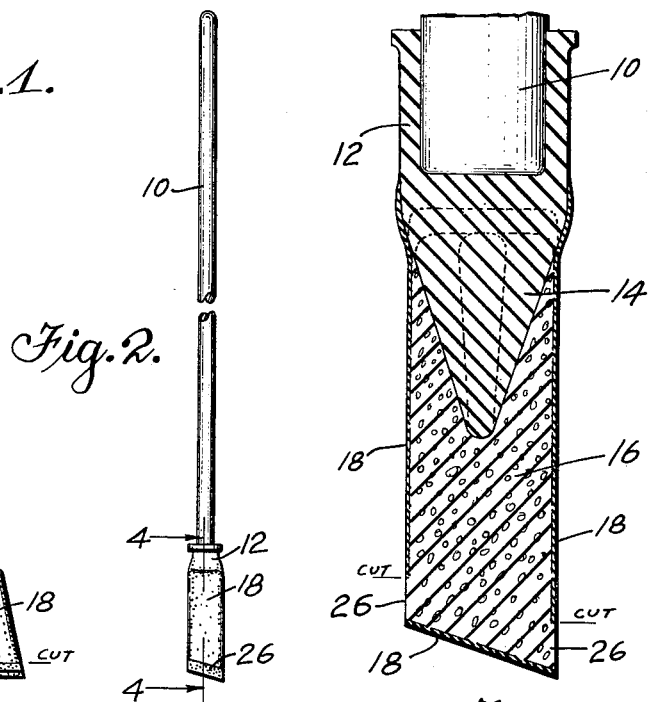
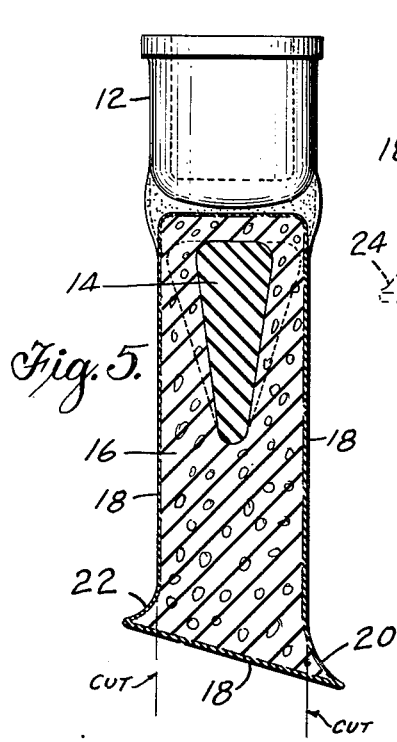
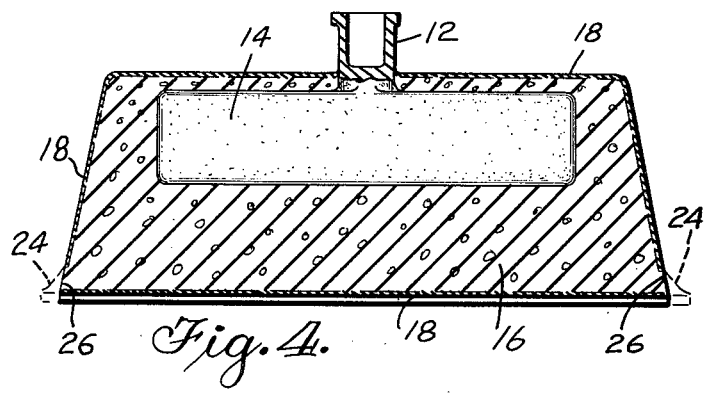
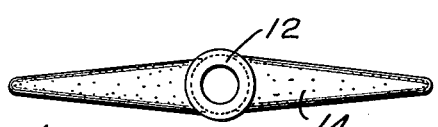
INVENTOR.
BY Wallace J. Lorenz
Albert J. Fihe
ATTORNEY.

United States Patent Office 2,735,129
Patented Feb. 21, 1956

2,735,129

SPONGE RUBBER BROOM

Wallace J. Lorenz, Arlington, Calif.

Application January 23, 1953, Serial No. 332,824

1 Claim. (Cl. 15—244)

This invention relates to an improved sponge rubber broom, and one of the important objects of this invention is to provide a sponge rubber broom which is neat in appearance, smooth in operation and which is well constructed.

Another object is to provide a sponge broom which will outlast any combination of a corn straw broom and dust mop, and which is very light and perfectly balanced.

Another object is the provision of a broom which is completely enclosed in rubber and which therefore will not mar furniture or similar objects.

Yet another object is to provide a sponge broom which will wipe off dirt rather than raise dust, and which will sweep under low pieces of furniture.

Other and further important objects of the invention will be apparent from the disclosures in the accompanying drawing and following specification.

The invention, in a preferred form, is illustrated in the drawings and hereinafter more fully described.

In the drawings:

Figure 1 is an elevation of the improved sponge rubber broom of this invention.

Figure 2 is a side elevation of the broom as shown in Figure 1.

Figure 3 is an enlarged sectional view taken on the line 3—3 of Figure 1, looking in the direction indicated by the arrows.

Figure 4 is an enlarged vertical section on the line 4—4 of Figure 2, the inner core being shown in elevation instead of section and the handle removed.

Figure 5 is an enlarged section taken on the line 5—5 of Figure 1 looking in the direction indicated and showing the broom before the final finishing cuts have been made.

Figure 6 is a detailed top view of the reinforced insert which forms an important part of the broom of this invention.

As shown in the drawings:

The reference numeral 10 indicates generally the handle of the improved sponge rubber broom of this invention, one end of which is fastened into a socket 12 which is of conventional form and which comprises an integral part of a reinforcing element 14 tapered in shape as best shown in Figures 4, 5 and 6, and which is composed of some flexible yet fairly stiff material such as a relatively hard rubber which is preferably quite solid, as distinguished from the sponge rubber which forms the main portion of the broom of this invention.

This main sponge rubber portion is indicated at 16 and is shaped as shown, being molded in one piece over the reinforcing element 14, and it is of substantially the same width throughout its length as distinguished from the tapered structure of the reinforcing element 14.

The sponge rubber broom portion 16, when molded into position, is vulcanized on to the harder and more solid rubber portion 14. This is accomplished by heat, pressure and a liquid latex and this vulcanization securely fastens all parts together, and produces an outer protective skin or coating 18 which entirely surrounds and encompasses the sponge rubber portion 16.

While being molded, integral flanges, somewhat tapered and flared, are included in the original structure as illustrated at 20 and 22 in Figure 5, and the bottom portion is bevelled or formed on an angle as shown in Figures 3 and 5. The end portions of the elongated broom body 16—18 slope downwardly and outwardly.

Similar flared tapered portions 24 are also included at the ends of the preliminarily molded structure as shown by the dotted lines 24 in Figure 4.

These flared portions are then cut away as indicated in Figure 5, leaving the broom with straight-line sides and ends as indicated in Figures 1 and 3. These side and end cut away portions are preferably quite narrow, as shown by the reference numeral 26 in Figures 3 and 4, and of course do not have the protective outer skin 18. However, they can be made wider if desired or necessary, and act as squeegees to more readily pick up and retain dirt, dust, water and any other foreign material from the floor or other surface upon which the broom is being used.

It is these cut away portions that provide most of the wiping and cleaning action when the broom is in use, and consequently it is these portions which take up the greater percentage of the dust and dirt. This can be removed by striking the broom against some solid object, preferably outside of the room or space which is being cleaned, whereby the accumulated dust and dirt is readily discarded.

The relative great flexibility of the sponge portion when combined with the relative lesser flexibility of the reinforcing element, produces a broom which will prove adequate for working in corners and around the legs of tables, pianos, cabinets and other articles of furniture. The flexibility of the broom throughout its extent is proportionate to the amount of pressure which can be applied at any particular part of the broom when in normal use, and any breakage of the parts or breakthrough of the reinforcement with respect to the outer portion is eliminated.

It will be evident that herein is provided a sponge rubber broom which can be used on practically any kind of floor or wall, with or without cleaners or detergents, which will sweep rugs, liven rugs with liquid or powdered cleaners or water, which can be used on walls with or without cleaners and which additionally can be used for cleaning windows. The broom can further be used on waxed floors with high efficiency and good results, without cutting into the wax, and the broom can actually be used for spreading liquid wax on floors. The broom is built high enough so that dust will not fly over in the stroke and the porous exposed squeegee portions 26 assure of a most adequate and highly efficient removal of dust and dirt particles.

I am aware that many changes may be made and numerous details of construction varied throughout a wide range without departing from the principles of this invention, and I therefore do not purpose limiting the patent granted hereon otherwise than as necessitated by the prior art.

I claim as my invention:

A sponge rubber broom comprising a body and a handle, a socket in the body for the handle, a relatively stiff yet flexible reinforcing element integral with the socket, said reinforcing element tapering downwardly and tapering outwardly from its central portion, an elongated unitary sponge rubber main body portion fixed thereto and completely enclosing the reinforcing element, the sponge rubber body portion having straight parallel sides, downwardly and outwardly sloping ends, and a beveled bottom surface, an integral skin partially enclosing the sides and the entire area of the bottom surface of the spong rubber body portion, said integral skin being cut away adjacent the lower periphery of the broom portion, said cut away portion exposing the inner porous sponge rubber body for better collection and absorption of foreign materials.

References Cited in the file of this patent

UNITED STATES PATENTS

| | | |
|---|---|---|
| 701,278 | Adcock | June 3, 1902 |
| 2,099,030 | Morrison | Nov. 16, 1937 |
| 2,186,050 | Vaughn | Jan. 9, 1940 |
| 2,231,234 | Weil | Feb. 11, 1941 |
| 2,237,793 | Rudd | Apr. 8, 1941 |
| 2,315,996 | Workman | Apr. 6, 1943 |
| 2,638,615 | Marchus | May 19, 1953 |

FOREIGN PATENTS

| | | |
|---|---|---|
| 503,956 | France | Mar. 29, 1920 |
| 425,719 | Italy | Oct. 10, 1947 |